No. 807,165. PATENTED DEC. 12, 1905.
R. GRAHAM.
FLY TRAP.
APPLICATION FILED APR. 17, 1905.
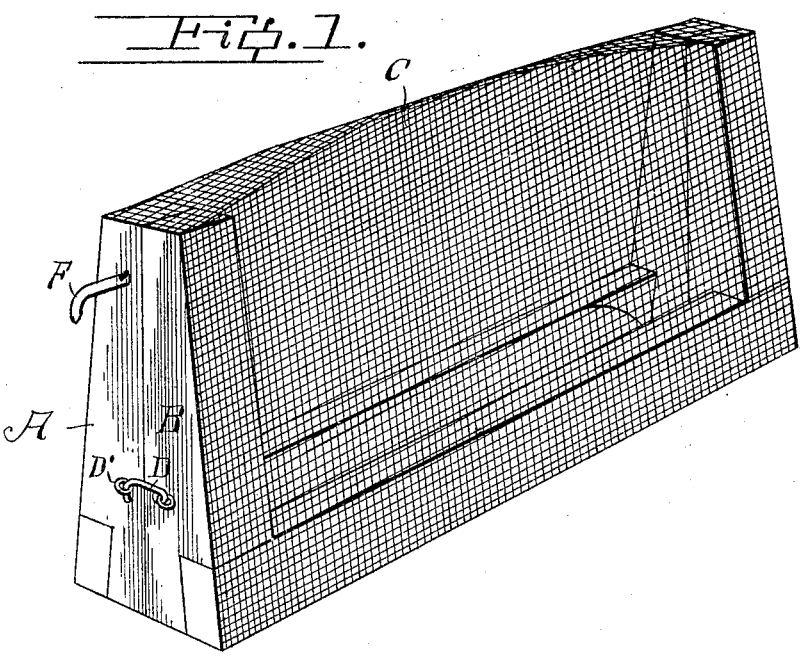
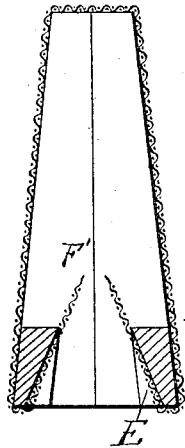
Robert Graham
Inventor

UNITED STATES PATENT OFFICE.

ROBERT GRAHAM, OF GREELEY, COLORADO.

FLY-TRAP.

No. 807,165.      Specification of Letters Patent.      Patented Dec. 12, 1905.

Application filed April 17, 1905. Serial No. 255,973.

*To all whom it may concern:*

Be it known that I, ROBERT GRAHAM, a citizen of the United States, residing at Greeley, in the county of Weld and State of Colorado, have invented certain new and useful Improvements in Fly-Traps, of which the following is a specification.

My invention relates to improvements in fly-traps; and one object of my invention is to devise a trap for the purpose of catching flies and other insects that naturally gather at and near the top of screen-doors in residences and other places. The contrivance is adapted to hang at the top of screen-doors or above the same for the purpose of allowing flies to enter the aperture in the bottom thereof, and they may then be destroyed by the usual methods. Flies naturally gather at or near the top of screen-doors, and when the door is opened they easily obtain entrance to the residence; but with this contrivance the flies will enter the aperture in the bottom of the trap, and when a sufficient number have accumulated they may then be destroyed. The catcher may be located either at the top of screen-doors or screen-windows and be held in place by means of small hooks, and common fly-paper or other attractive bait may be inserted in the trap.

Another object of my invention is the production of a fly-trap which will be durable and not liable to be broken or collapsed by pressure, which may be opened or unfolded to form a flat screen for ease of packing, transportation, or storing, and which could when open be used as an ordinary window-screen, if circumstances required.

With these objects in view my invention consists of a fly-trap of novel features of construction and combination of parts, substantially as disclosed herein.

Figure 1 is a perspective view of the trap in closed or operative position, and Fig. 2 is a vertical sectional view.

The trap consists of the two frame members A and B, hinged together by means of wire netting or screening C, said members being held in closed position by means of the hook D and eye D'. The lower horizontal section of the frame members is cut away, as at E, to provide a V-shaped opening in the bottom of the trap. The wire-netting is stretched over and suitably secured to the frame members, and the ends of said netting project within the V-shaped opening and above the horizontal members, and while allowing entrance to the trap these ends provide against egress therefrom and form the trapping device F'. The whole trap forms a V-shaped chamber, and when sufficiently full the trap may be opened and the contents removed therefrom. Hooks are provided at each end of the trap, so that it may be hung in any suitable position.

From the foregoing description, taken in connection with the drawings, it is evident that I provide a device for the purpose named which is simple and durable in construction, may be made at a very low cost, and which is very efficient in operation.

Having thus described my invention, what I claim as new, and desire to secure by Letters Patent, is—

1. In a trap for catching insects the combination of two frame members flexibly connected by wire-netting and provided at their inner lower edges with cut-away portions to allow the entrance of insects, the ends of the netting being turned up between the said frame members to form a trapping device.

2. In a fly-trap, the combination of the two frame members flexibly connected by wire-netting, the ends of said frame members fitting snugly together and the bottom part of the members being cut away to form a V-shaped opening in the bottom of the trap.

3. In a fly-trap, the combination of two frame members connected flexibly or foldingly together at their tops and covered by wire-netting, ends of said netting extending upwardly within an opening formed between the said frame members.

In testimony whereof I affix my signature in presence of two witnesses.

ROBERT GRAHAM.

Witnesses:
    H. E. CHURCHILL,
    EDNA ONSTINE.